United States Patent [19]

Berke et al.

[11] Patent Number: 5,005,964

[45] Date of Patent: Apr. 9, 1991

[54] SPECTACLES WITH COMBINED SLIDING AND PIVOTING REAR VISION ELEMENTS

[76] Inventors: Joseph J. Berke, 2063 Long Lake Shore, West Bloomfield, Mich. 48033; George H. Muller, 1955 Gulf of Mexico Dr., Long Boat Key, Fla. 34228; A. Gil Spear, Jr., 915 Sea Grape Ln., Vero Beach, Fla. 32963

[21] Appl. No.: 463,937

[22] Filed: Jan. 8, 1990

Related U.S. Application Data

[63] Continuation of Ser. No. 243,855, Sep. 13, 1988, abandoned.

[51] Int. Cl.⁵ .................................................. G02C 7/14
[52] U.S. Cl. ............................................................... 351/50
[58] Field of Search .................... 351/50, 158; 350/638

[56] References Cited

U.S. PATENT DOCUMENTS 4,798,454  1/1989  Hyun .................................... 351/50

FOREIGN PATENT DOCUMENTS

| 442782 | 11/1948 | Italy | 351/50 |
| 525330 | 5/1955 | Italy | 351/50 |
| 619249 | 3/1961 | Italy | 351/50 |

Primary Examiner—Rodney B. Bovernick
Attorney, Agent, or Firm—Alex Rhodes

[57] ABSTRACT

A fashionable pair of spectacles with combined sliding and pivoting elements for viewing objects behind a forward facing user. The spectacles have temples at opposite ends of the eyepiece with longitudinal apertures for receiving closely fitting shafts. A pair of slender round shafts engage the apertures and have orthogonal forward end portions which project out of the apertures and receive reflective elements for viewing objects behind the user. In the first aspect of the invention, each reflective element is rotatably mounted to the orthogonal end of one shaft and is selectively adjustable by translating and rotating the shaft along and about the longitudinal axis of the corresponding temple aperture and by rotating the element about the axis of the orthogonal foward portion of the shaft. At the operative positions of the elements, the elements are in confronting relationship to the user and in front of the eyepiece and in the non-operative positions of the elements, the elements are in side facing relationship to the user and the eyepiece. In the second aspect of the invention each element is further adjustable by separating and rotatably attaching the forward end of the shaft to the other part of the shaft.

8 Claims, 1 Drawing Sheet

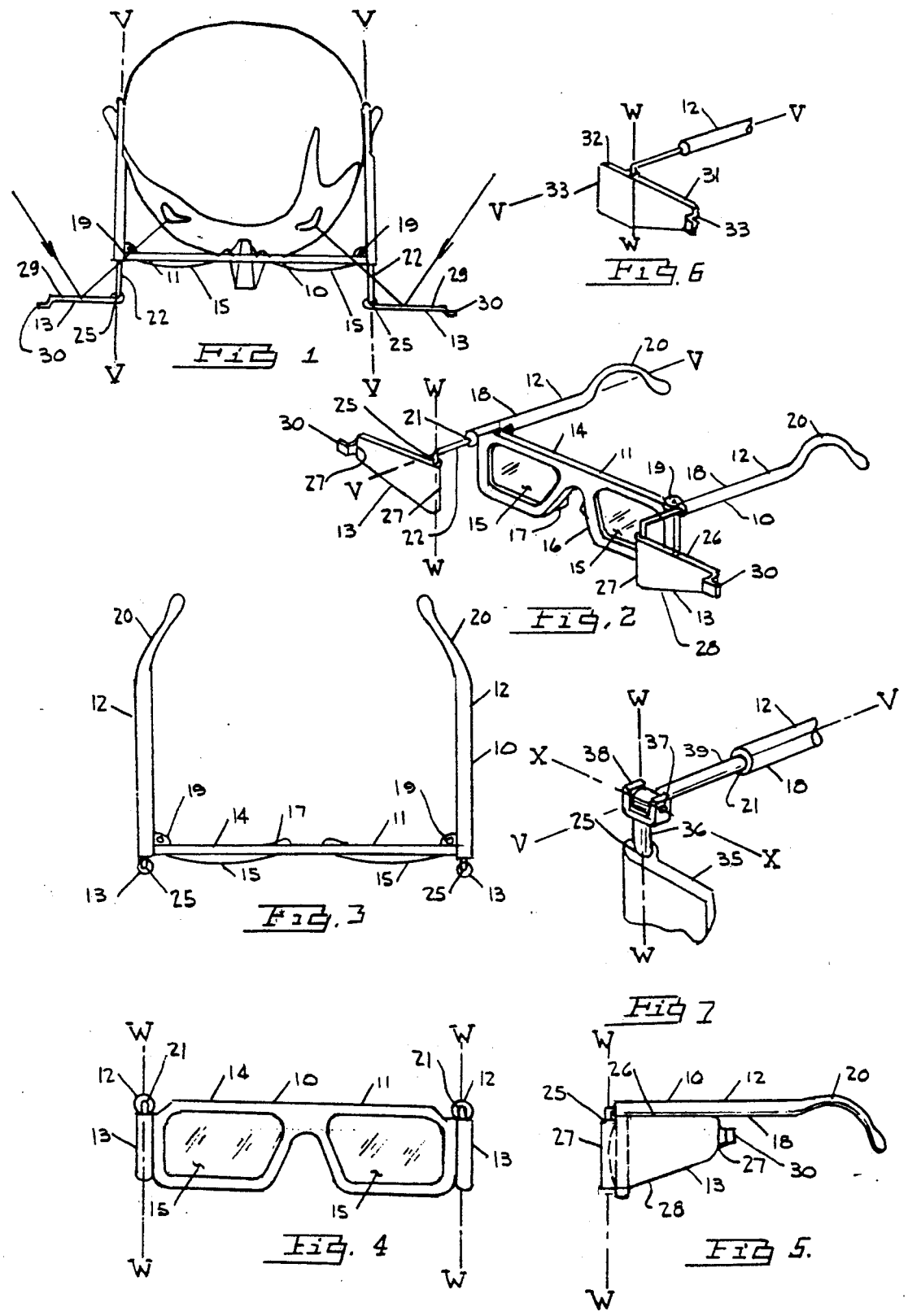

SPECTACLES WITH COMBINED SLIDING AND PIVOTING REAR VISION ELEMENTS

This is a continuation of copending application Ser. NO. 243,855, filed on Sept. 13, 1988, now abandoned.

BACKGROUND OF THE INVENTION

This invention relates to spectacles and more particularly spectacles which enable a forward facing user to observe objects behind the user. In co-pending application Ser. No. 07/243,871, filed on Sept. 13, 1988, it was pointed out that viewing objects at the rear would be entertaining to some users and would improve the safety of others, namely, motorists, motorcyclists, bicyclists, joggers, industrial workers, servicemen, policemen and pedestrians. It was further pointed out that despite these important benefits, rear vision spectacles heretofore offered have not been accepted by the public because of their unsightly appearances and functional deficiencies.

Comstock U.S. Pat. No. 2,176,167, Binner U.S. Pat. No 4,349,246, and Teiber U.S. Pat. No. 1,691,789 were cited in the co-pending application, as being exemplary of the prior art.

Comstock's patent discloses an unsightly pair of spectacles with a restricted rearward field of vision by means of crescent shaped mirrors at opposite lower end portions of the spectacles' frame. Binner's patent discloses an unsightly pair of spectacles with a large detachable circular mirror extending laterally outwardly from the spectacles' frame. Teiber's patent discloses an unsightly pair of spectacles with mirrors mounted on fixed arms which project forward from the end portions of the spectacles' frame and obstruct the user's forward vision.

In the referenced co-pending application, single pivot rear vision elements are rotatably mounted to an eyepiece and are selectively adjustable about their single pivot mounting axes to operative positions whereat reflective portions of the elements are forward of the eyepiece and in confronting relationship to the user and to non-operative positions whereat the reflective portions are in side facing relationship to the eyepiece and the user. A feature of the spectacles of the co-pending application is that the elements have a bent configuration whereby the reflective portions are substantially forward of the eyepiece in their operative positions and alongside the eyepiece in the non-operative positions. At the non-operative positions, the elements are not readily discernible as separate members of the spectacles.

SUMMARY OF THE INVENTION

The present invention is directed to a fashionable pair of spectacles with rear vision elements and more particularly to spectacles having combined sliding and pivoting rear vision elements which are selectively adjustable to operative positions whereat reflective surfaces of the elements are in forward confronting relationship to the user and to non-operative positions whereat the elements are in side facing relationship to the user. One benefit of the invention is that the rearward field of vision has a wide range of adjustments and can be enlarged and adjusted both vertically and horizontally. Another benefit of the invention is that it is adaptable to existing spectacle frames.

In the first aspect of the invention, a pair of symmetrically opposite temples are rotatably mounted to opposite ends of an eyepiece and have longitudinal apertures for receiving slender round shafts. Slender round shafts are mounted in the temple apertures and have orthogonal forward end portions which project out of the apertures. A rear vision element is rotatably mounted on the end of each shaft and has a reflective surface for viewing objects behind the user. The rear vision elements are selectively adjustable by sliding and rotating the shaft along and about the longitudinal apertures of the temples and by rotating the element about the axes of the orthogonal forward portions of the shafts.

In the second aspect of the invention the elements are further adjustable by separating and rotatably attaching the forward ends of the shaft to the other portions of the shafts which are mounted in the longitudinal apertures of the temples.

When the rear vision elements are not in use and stored in side facing relationship to the user, they are not readily discernible as separate members of the spectacles.

It is a primary object of the present invention to provide in a pair of rear vision spectacles of conventional appearance rear vision elements which have a wide range of adjustment for varying the rearward field of vision of users of the spectacles.

It is another object, in addition to the foregoing object, to provide a pair of rear vision spectacles wherein the elements for observing objects at the rear are not readily discernible as separate elements when the elements are not in use.

It is another object, in addition to the foregoing objects, to provide an effective pair of rear vision spectacles which are easy to use.

It is another object, in addition to the foregoing objects, to provide a pair of rear vision spectacles with retractable elements which can be stored in a conventional type eyeglass case.

Additional features, benefits and objects of the invention will become apparent from the ensuing description and accompanying drawings which describe the invention in detail. A preferred embodiment and the manner of using the same are disclosed in accordance with the best mode contemplated in practicing the invention and the subject matter in which exclusive property rights are claimed is set forth in each of the numbered claims at the conclusion of the detailed description of the invention.

BRIEF DESCRIPTION OF THE DRAWINGS

FIG. 1 is a plan view of a person with a pair of spectacles with combined sliding and rotating rear vision elements shown in their operative positions.

FIG. 2 is a perspective view of the spectacles of FIG. 1 showing the combined sliding and pivoting rear vision elements in their non-operative positions.

FIG. 3 is a plan view of the spectacles shown in FIGS. 1 and 2 with the rear vision elements in their non-operative positions.

FIG. 4 is a front view of the spectacles shown in FIG. 3.

FIG. 5 is a left side view of the spectacles shown in FIG. 3.

FIGS. 6 and 7 are alternate embodiments of the invention.

DETAILED DESCRIPTION OF THE PREFERRED EMBODIMENT

Referring now to the drawings wherein like numerals designate like and corresponding parts throughout the several views, the first aspect 10 of the present invention which is disclosed for illustrative purposes in FIGS. 1 through 5, inclusive, comprises a binocular eyepiece 11, a pair of temples 12 mounted to the ends of the eyepiece 11 for rotation about a vertical U—U axis and a pair of symmetrically opposite rear vision elements 13 mounted in the temples 12 for combined sliding and rotation along and about a horizontal V—V axis, and rotation about a W—W axis which is orthogonal to the V—V axis.

The eyepiece 11 is conventional and has a frame 14 and a pair of lenses 15 mounted in the frame 14. The lenses 15 may be refractive type lenses 15 for improving the user's vision and/or tinted lenses 15 which are commonly used in sun glasses. The center portion of the eyepiece frame 14 has an upward extending recess 16 which forms a bridge for supporting the eyepiece 11 on the user's nose and at the sides of the recess 16 are integral nose pads 17.

Referring now to FIG. 1, each of the temples 12 has a straight slender horizontal forward portion 18 which is rotatably attached to an upper outer end portion 19 of the eyepiece 11 and an adjoining arcuate rear portion 20. The straight forward portion 18 has a longitudinal aperture 21 which receives a closely fitting slender round shaft 22. The shaft 22 is slideable and rotatable in the aperture 21 and the axis of the aperture 21 in the temple 12 defines the U-U axis about which the rear vision element 13 is slideable and rotatable.

The forward end 23 of the shaft 22 projects out of the temple 12 and is orthogonal to the adjoining rearward end 24 which is mounted in the temple 12. Each of the rear vision elements 13 has an aperture 25 wherein the forward portion 23 of the shaft 22 is closely fitted for rotation and the axis of the aperture 25 defines the W—W axis about which the rear vision element 13 is further rotatable.

The construction of the rear vision elements 13 is best understood by reference to FIG. 2 wherein the elements 13 are shown in their operative positions for observing objects at the rear of the user. Each of the symmetrically opposite rear vision elements 13 has a horizontal upper margin 26, vertical side margins 27 and a lower angular margin 28. One surface 29 of each element 13 is a reflective surface 29 wherein objects at the rear of the user are visible when the element 13 is at its operative position. At one of the side margins 27 are apertures 25 which receive the forward portions 23 of the shafts 22 which are mounted in the temples 12. The other side portions of the elements 13 form tabs 30 for grasping and adjusting the elements 13 with the user's fingers.

Each of the rear vision elements 13 is selectively adjustable to an operative position whereat the reflective surface 29 of the element 13 is in confronting relationship to the user and to a non-operative position whereat the reflective surface 29 is in side facing relationship to the user. The operative positions of the rear vision elements 13 is best understood by reference to FIGS. 1 and 2. At the operative positions the elements 13 are substantially forward of the eyepiece 11 and their reflective surfaces 29 are in clear view of the user. The rearward fields of vision are independently adjustable by sliding and rotating the elements 13 along and about the V—V axes and rotating the elements about the W-W axes.

The non-operative positions of the elements 13 are best understood by reference to FIGS. 3 through 5, inclusive. At the non-operative positions, the rear vision elements 13 are directly below and alongside the temples 12 with the reflective surfaces 29 of the elements 13 in side facing relationship to the user. It will be observed that in the non-operative positions, the appearance of the elements 13 is consonant with the overall appearance of the spectacles 10 and they are not readily discernible as separate elements 13 of the spectacles 10.

The manner of using the invention is as follows. The rear vision elements 13 are stored at their innermost positions alongside the temples 12 when they are not in use. In these positions, the shafts 22 which carry the elements 13 are fully retracted into the temples 12, the elements 13 are aligned with the temples 12 and the reflective surfaces 29 ar in side facing relationship with the user. When it is desired to move the elements 13 to their operative positions whereat objects behind the user become visible in the reflective surfaces 29 of the elements 13, the elements' tabs 30 are grasped with the user's fingers and the elements 13 are rotated outwardly about the W—W axes and translated forwardly along the V—V axes to the operative positions shown in FIGS. 1 and 2. At the operative positions, the rearward field of vision of each element 13 is adjusted by translating and rotating the element 13 along and about the V—V axis and rotating the element 13 about the W-W axis. When rear vision is no longer desired, the elements 13 are retracted to the non-operative positions shown in FIGS. 3 through 5, by grasping the finger tabs 30, translating and rotating the elements 13 along and about the V—V axes and rotating the elements 13 about the W—W axes.

In FIG. 6 an embodiment 31 is disclosed wherein a rear vision element 32 is rotatably supported between the vertical side margins 33 of the element 32 rather than at the side margin of the element 13 as shown in FIGS. 1 and 2. This construction provides the advantage of presenting a larger element to the user through the corrective lens 15 of the spectacles.

In FIG. 7 a second aspect of the invention is disclosed for providing a third axis of adjustment of the elements 35. The rear vision element 35 is rotatably attached to a short slender round shaft 36 having a yoke end portion 38 which is rotatably attached by a pin 37 to a shaft 39 which is slideably and rotatably mounted in the temple 12. The axis of the pin 37 defines an X—X axis of rotation which is orthogonal to the V—V axis and the W—W axis.

From the foregoing, it will be appreciated that the present invention provides a fashionable, easy to use and effective pair of spectacles for enabling a forward facing user to observe objects at the rear. It will be further appreciated that the invention will entertain many of its users and will enhance the safety of persons exposed to danger, by way of example, motorists, motorcyclists, bicyclists, joggers, industrial workers, servicemen, and policemen.

Although several embodiments of our invention have been described, it will be understood that other embodiments can be provided by changes in the material, size, shape and arrangement of its parts without departing from the spirit thereof.

We claim:

1. A pair of spectacles having a means for viewing objects behind a forward facing user which is integrated into a temple of the spectacles, comprising, in combination: an eyepiece, said eyepiece having a frame and a pair of lenses mounted in said frame; a pair of symmetrically opposite temples rotatably attached to the opposite outer ends of said frame, at least one of said temples having a longitudinal aperture for receiving a closely fitting slender cylindrical shaft; a slender cylindrical shaft having one portion engaging said aperture which is adjustably slideable along the axis of said aperture from a fully extended position out of said temple to a fully retracted position into said temple and adjustably rotatable about said axis throughout the full range of adjustment of said shaft along the axis of said aperture and an adjoining portion which is external to said temple and orthogonal to said first portion; and a reflective element which is visible through one of said lenses for viewing objects behind a user of said spectacles, said reflective element being mounted on said forward orthogonal portion of said shaft and being selectively rotatable about the axis of said orthogonal portion of said shaft.

2. The pair of spectacles for viewing objects behind a forward facing user recited in claim 1 further comprising a longitudinal aperture in said other temple for receiving another same closely fitting shaft; and a rear viewing element which is symmetrically opposite said rear viewing element mounted on the forward portion of said additional shaft.

3. The pair of spectacles for viewing objects behind a forward facing user recited in claim 1 wherein said pair of lenses are refractive lenses for improving the vision of a user.

4. The pair of spectacles for viewing objects behind a forward facing user recited in claim 1 wherein said pair of lenses are tinted lenses.

5. The pair of spectacles for viewing objects behind a forward facing user recited in claim 1 wherein said aperture for receiving the forward orthogonal portion of said shaft is at a side margin of said element.

6. The pair of spectacles for viewing objects behind a forward facing user recited in claim 1 wherein said aperture for receiving the forward orthogonal portion of said shaft is between the side margins of said element.

7. A pair of spectacles having a means for viewing objects behind a forward facing user which is integrated into a temple of the spectacles, comprising, in combination: an eyepiece, said eyepiece having a frame and a pair of lenses mounted in said frame; a pair of temples for retaining said spectacles on the head of a user, each of said temples having a straight portion which is rotatably attached to an end portion of said frame; a reflective element mounted to said temple; said reflective element being visible to a user of said spectacles through one of said lenses for viewing objects behind said user, a means for selectively moving said reflective element in a direction parallel to said temple from a maximum operative position forward of said eyepiece to a minimum operative position adjacent to said eyepiece; a means for selectively rotating said reflective element about an axis parallel to said temple throughout the full range of movement of said reflective element parallel to said temple; and a means for selectively rotating said reflective element about an axis which is orthogonal to said temple.

8. A pair of spectacles having a means for viewing objects behind a forward facing user which is integrated into a temple of the spectacles, comprising, in combination: an eyepiece, said eyepiece having a frame and a pair of lenses mounted in said frame; a pair of symmetrically opposite temples rotatably attached to the opposite outer ends of said frame, at least one of said temples having an aperture extending along the length of one of said temples for receiving a closely fitting shaft; a slender cylindrical shaft having one portion slideably engaging said aperture which is selectively adjustable along the axis of said first aperture axis from a fully extended position out of said temple to a fully retracted position into said temple and is selectively rotatable about said first axis throughout the full range of adjustment of said shaft along the axis of said aperture, said shaft having a short outer cylindrical end portion which is orthogonal to said other portion, said short cylindrical portion having an aperture, the axis of said aperture defining a second axis which is orthogonal to said first axis; a second slender cylindrical shaft connected to said first cylindrical shaft, the longitudinal axis of said second shaft defining a third axis and said second shaft being rotatable about said second axis and having a yoke end portion, said yoke end portion having an aperture aligned with said aperture of the orthogonal end portion of said first shaft; and a reflective element, for viewing objects behind a user of said spectacles, mounted on said forward orthogonal portion of said shaft, said reflective element being selectively rotatable about said third axis.

* * * * *